(12) United States Patent
Pouchak

(10) Patent No.: US 8,239,500 B2
(45) Date of Patent: Aug. 7, 2012

(54) FLEXIBLE GRAPHICAL EXTENSION ENGINE

(75) Inventor: Michael Andrew Pouchak, Saint Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 456 days.

(21) Appl. No.: 12/256,444

(22) Filed: Oct. 22, 2008

(65) Prior Publication Data

US 2010/0100583 A1   Apr. 22, 2010

(51) Int. Cl.
G06F 15/177 (2006.01)
G06F 15/16 (2006.01)

(52) U.S. Cl. ........................... 709/220; 709/203

(58) Field of Classification Search .......... 709/220–223, 709/203
See application file for complete search history.

(56) References Cited

U.S. PATENT DOCUMENTS

| | | | |
|---|---|---|---|
| 6,536,678 B2 | 3/2003 | Pouchak | |
| 6,549,826 B1 | 4/2003 | Pouchak et al. | |
| 6,647,302 B2 | 11/2003 | Pouchak | |
| 6,694,927 B1 | 2/2004 | Pouchak et al. | |
| 6,745,085 B2 | 6/2004 | Pouchak | |
| 6,813,631 B2 | 11/2004 | Pouchak et al. | |
| 6,891,838 B1* | 5/2005 | Petite et al. | 370/401 |
| 6,904,874 B1 | 6/2005 | Pouchak et al. | |
| 7,083,109 B2 | 8/2006 | Pouchak | |
| 7,774,441 B2* | 8/2010 | Frutiger et al. | 709/221 |
| 2002/0152298 A1* | 10/2002 | Kikta et al. | 709/223 |
| 2006/0159007 A1* | 7/2006 | Frutiger et al. | 370/216 |
| 2007/0055757 A1* | 3/2007 | Mairs et al. | 709/223 |
| 2007/0143451 A1* | 6/2007 | Huth et al. | 709/220 |
| 2007/0260713 A1* | 11/2007 | Moorer et al. | 709/220 |

* cited by examiner

Primary Examiner — Minh-Chau Nguyen
(74) Attorney, Agent, or Firm — Seager Tufte & Wickhem LLC

(57) ABSTRACT

A flexible graphical extension engine having a function block engine combined with extensions in communications with a wall module bus to make it possible to provide fixed function, configurable function and programmable function devices which implement additional function block behavior, and provide an automated configuration approach for generating configuration files for a programmable wall module. In other words, the engine not only depends on fixed inputs and outputs (I/O's) and fixed features in a control solution, but also may allow for flexible blocks and the ability to change an interface on the fly (i.e., during operation).

21 Claims, 12 Drawing Sheets

FIGURE 3b

| | Field | Type | Value | NOT | Comments |
|---|---|---|---|---|---|
| 1 | sysStatus | INPUT | | | |
| 2 | occStatus | INPUT | | | |
| 3 | sysModeCmd | OUTPUT | 3 | | |
| 4 | fanCmd | OUTPUT | 2 | | |
| 5 | occOverride | OUTPUT | 7 | | |
| 6 | setpt1 | INPUT | | | |
| 7 | PARAM 1 | OUTPUT | FL_INVALID | | |
| 8 | | | | | |
| 9 | | | | | |

Function Block Type:
Function Block Name: CWM1

CWM Device Address: 8
FBEP Device Address: 0

CWM : File 0 Send Freq (Sec) 15
CWM : File 1 Send Freq (Sec) 5
CWM : File 2 Send Freq (Sec) 5
CWM : File 3 Send Freq (Sec) 10

File 0 Read Only ☑
File 1 Read Only ☐
File 2 Read Only ☐
File 3 Read Only ☐

File 0 Close Timeout  9
File 1 Close Timeout  9
File 2 Close Timeout  9
File 3 Close Timeout  9

CWM Send  FBEP Send
5         10
5
15        25
25

OK    Help

Device Name   CWM

Resource Useage
Control Floats = 10
Control Digitals = 0
Control NonVolatiles = 0
Flash Constants = 0
Bytes RAM pool Used = 78
Bytes Loop Static = 0
Function Blocks = 1
User NVIs = 2
User NVOs = 2

Function Block Data

| Type | Name |
|---|---|
| ADD | ADD1 |

| Wrd | Name | PVID(hex) | PVID(dec) | Value |
|---|---|---|---|---|
| 0 | x1 | 0000 | 00000 | 0 |
| 1 | x2 | 0001 | 1 | 0 |
| 2 | x3 | FFFF | 65535 | 0 |
| 3 | x4 | FFFF | 65535 | 0 |
| 4 | x5 | FFFF | 65535 | 0 |
| 5 | x6 | FFFF | 65535 | 0 |
| 6 | x7 | FFFF | 65535 | 0 |
| 7 | x8 | FFFF | 65535 | 0 |
| 8 | y | 0002 | 2 | 0 |

| Byt | Name | Value |
|---|---|---|
| 0 | invalidFlag | 0 |
| 1 | | 0 |
| 2 | spare | |

User NV Configuration Data

| NV Name | Field Name | PVID(hex) | PVID(dec) | Value |
|---|---|---|---|---|
| nviIn2 | Field1 | 0 | 0 | 0 |
| nviIn2 | Field2 | 1 | 1 | 0 |
| nviIn2 | Field3 | FFFF | 65535 | 0 |
| nviIn5 | Field1 | 3 | 3 | 0 |
| nviIn5 | Field2 | 4 | 4 | 0 |
| nviIn5 | Field3 | 5 | 5 | 0 |
| nviIn5 | Field4 | FFFF | 65535 | 0 |
| nvoOut3 | Field1 | 2 | 2 | N/A |
| nvoOut3 | Field2 | FFFF | 65535 | N/A |
| nvoOut3 | Field3 | FFFF | 65535 | N/A |
| nvoOut6 | Field1 | 6 | 6 | N/A |
| nvoOut6 | Field2 | 7 | 7 | N/A |
| nvoOut6 | Field3 | 8 | 8 | N/A |
| nvoOut6 | Field4 | 9 | 9 | N/A |

Control Constants
PVID(Hex) PVID(Dec) Value

FIGURE 3c

Device Name kf26

Function Block Data

| Type | Name |
|---|---|
|  | CWM1 |

| Wrd | Name | PVID(hex) | Description | Input/output | Hex value | Float value |
|---|---|---|---|---|---|---|
| 0 | sysStatus | 0003 | FBEP - Send Group 01 1000<--0003 | Input 0 | 40400000 | 3.00 |
| 1 | occStatus | 0004 | FBEP - Send Group 01 1001<--0004 | Input 1 | 40000000 | 2.00 |
| 2 | sysModeCmd | 0006 | CWM  Send Group 01 0006<--3001 | Output 0 | 40E00000 | 7.00 |
| 3 | fanCmd | 0007 | CWM  Send Group 01 0007<--3000 | Output 1 | 7F7FFFFF | FL_INVALID |
| 4 | occOverride | 0008 | CWM  Send Group 01 0008<--3002 | Output 2 | 7F7FFFFF | FL_INVALID |
| 5 | setpt1 | 0005 | FBEP - Send Group 01 0000<--0005 | Input 2 | | |
| 6 | PARAM 1 | 0009 | | Output 3 | | |
| 7 |  | FFFF | | 0 | | |
| 8 |  | FFFF | | 0 | | |

Group and Send Table information

CWM File update rates

File 0 update Freqency :3 = 15 seconds , Freq 3 Dev Addr 8 Read Only 1 File ID  0 Close TimeOut 9
File 1 update Freqency :1 =  5 seconds , Freq 1 Dev Addr 8 Read Only 0 File ID  1 Close TimeOut 9
File 2 update Freqency :1 =  5 seconds , Freq 1 Dev Addr 8 Read Only 0 File ID  2 Close TimeOut 9
File 3 update Freqency :2 = 10 seconds , Freq 2 Dev Addr 8 Read Only 0 File ID  3 Close TimeOut 9

CWM Group tables

| ID | groupFreq | group Seconds | group Dest Addr |
|---|---|---|---|
| 0 | 1 | 5 | 1 |
| 1 | 3 | 15 | 1 |

CWM Send tables

| ID | Group ID | FBEP Dest PVID | - | CWM Source PVID | Freq | Freq in Sec. | Dest Addr |
|---|---|---|---|---|---|---|---|
| 0 | 0 | 0006 |  | 3001 | 1 | 5 | 1 |
| 1 | 0 | 0007 |  | 3000 | 1 | 5 | 1 |
| 2 | 1 | 0008 |  | 3002 | 3 | 15 | 1 |

FBEP Groups tables

| ID | groupFreq | group Seconds | group Dest Addr |
|---|---|---|---|
| 0 | 2 | 10 | 8 |
| 1 | 5 | 25 | 8 |

FBEP Send tables

| ID | Group II | CWM Dest PVID | ... | FBEP Source PVID | Freq | Freq in Sec. | Dest Addr |
|---|---|---|---|---|---|---|---|
| 0 | 0 | 1000 |  | 0003 | 2 | 10 | 8 |
| 1 | 0 | 1001 |  | 0004 | 2 | 10 | 8 |
| 2 | 1 | 0000 |  | 0005 | 5 | 25 | 8 |

FIGURE 3d

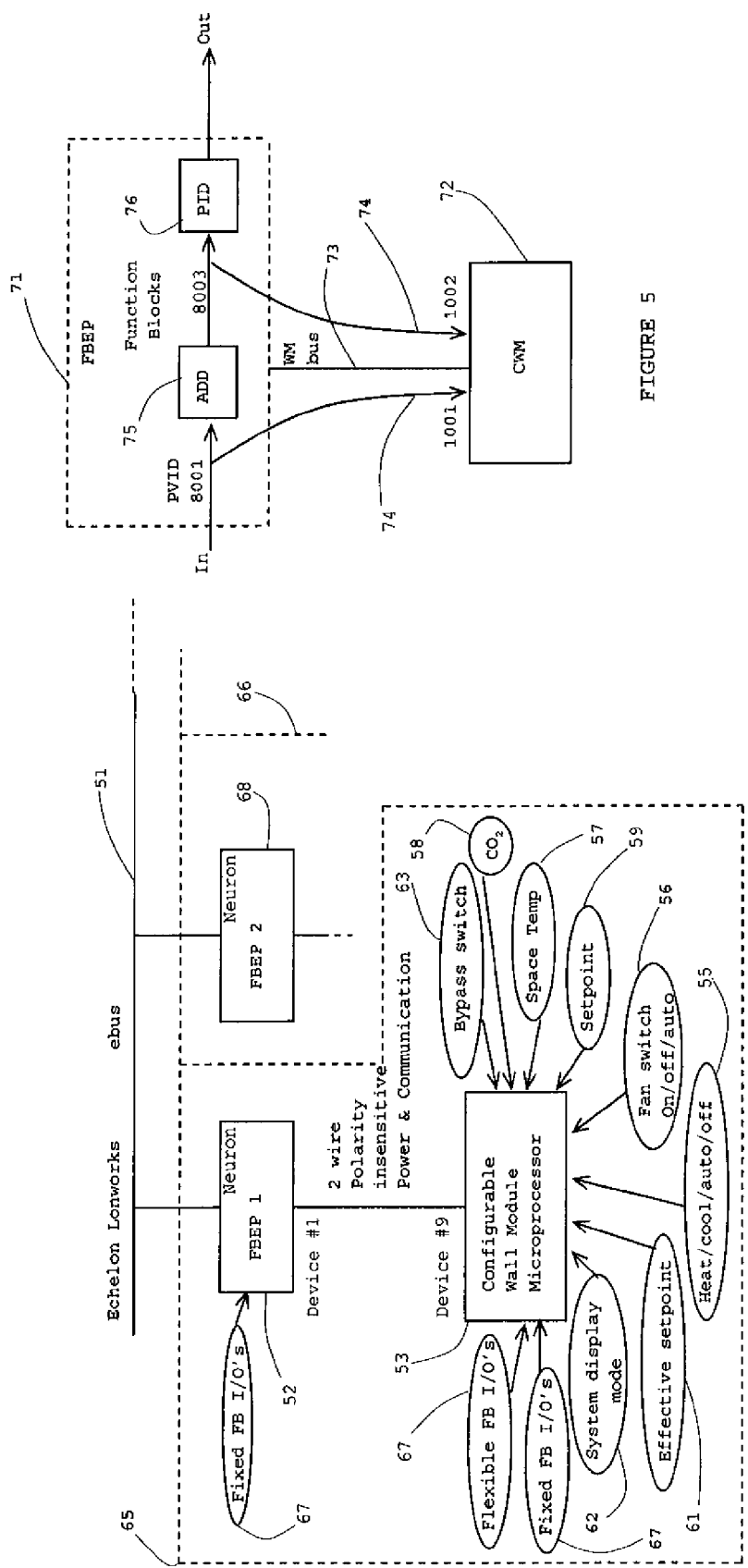

FLEXIBLE GRAPHICAL EXTENSION ENGINE

BACKGROUND

The present invention pertains to engines for designing systems, and particularly to designing controller systems. More particularly, the invention pertains to changing on the fly aspects of the control systems.

SUMMARY

The invention is a graphical extension engine system that not only depends on fixed inputs and outputs (I/O's) and fixed features in a control solution, but also may allow for flexible blocks and the ability to change an interface on the fly (i.e., during operation).

BRIEF DESCRIPTION OF THE DRAWING

FIG. 3b is diagram of a form for indicating the inputs and outputs of the wall module;

FIG. 3c is a table showing function block data and user NV configuration data;

FIG. 3d is a table showing function block data and group and send table information;

FIG. 4 is a diagram of the interconnections among components having fixed and flexible function block inputs and outputs;

FIG. 5 is a diagram of a basic layout of a function block mechanism and its interface with a wall module;

DESCRIPTION

Figure 1:
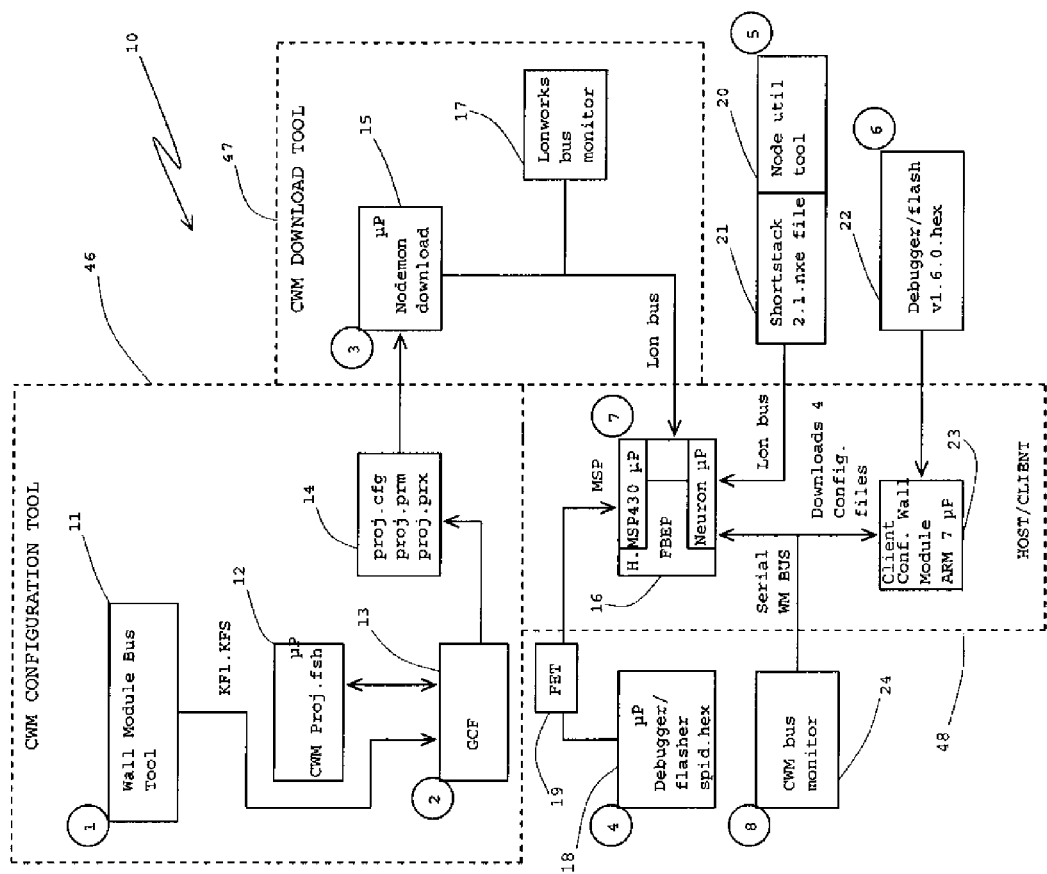
FIG. 1 is a diagram of the processes of the flexible graphical engine.

Modern HVAC controllers require a diverse set of features to be successful items. Such features may include low manufacture cost, ability to do complex control, and have flexibility. Some approaches may depend on fixed inputs and outputs (I/O's) and fixed features in the control solution. Another approach herein may allow for flexible blocks and the ability to change the interface on the fly (i.e., during operation).

Networked building automation continues to expand in complexity and programmability. There may be a function block engine platform (referred to herein as FBEP) which may contain a function block engine. In the course of development of a FBEP programmable controller, the power of the function block engine may quickly demonstrate advantages of an expandable function block architecture. Through the use of the function block engine, combined with the extensions in communications with a wall module bus, it is possible to create fixed function, configurable function and programmable function devices which implement additional function block-like or true function block behavior. This may permit a powerful extension of the function block paradigm to communicate with other wall module function block engines and share local and remote public variable ID's through a wall module protocol. The FBEP programmable host should hold the configuration information and group and/or send public variable (PV) broadcast tables and a common proxy file repository that is downloaded to a programmable wall module client on demand. An automated configuration approach herein may generate configuration files for the programmable wall module. The wall module may be a configurable wall module (referred to herein as CWM) having an extension to communicate over a bus with a host such as the FBEP.

The present approach may include a flexible wall module development, and allow a basic fixed function block interface to not only be changed, but also to provide an ability to have a distributed function block interface coordinate and complement in a system environment.

The present approach may provide a flexible group/send and configuration structure that can be interfaced with a graphical tool compiler. By following an algorithm process and using the predefined data structures, an efficient solution may be provided.

The present approach may use a rule-based system to generate a compatible interface specification. This interface may be integrated into a graphical compiler interface engine and generate all of the necessary coordination values, network communication links, and appropriate changes to the fixed function block engine code.

The present structure may define pertinent and usable information for a programmable wall module device that communicates with a programmable controller. A common proxy file repository may consist of user customized wall module local and remote public variable links. A separate graphical function block compiler tool may incorporate the programmable wall module configuration and group/send table information along with new connection configuration information.

A major enhancement to the function block engine is an ability to extend the public variable identification (PVID) scheme over a low cost two wire polarity insensitive bus. A KF1.kfs file may be created by a configuration tool that describes a feature set needed to configure the wall module. Files may be arbitrarily be labeled herein with alphanumeric symbols (in upper and/or lower case) such as KF1.kfs, CFG1.KFS, and the like. The wall module may have limited segments and built-in functionality. The configuration tool may determine the PVID's for the local wall module (having a different function block engine than the FBEP). The PVID's may be mapped from the FBEP function block engine and connected to CWM PVID's. For example, a file sysStatus may go from FBEP 0018 to CWM 1000; occoverride may go from CWM 3002 to FBEP 0002; and so on. Update rates and other items may be determined by the configuration tool. The CWM may update the PVID's at a programmable rate (i.e., send freq) with a certain destination wall module bus address (FBEP may have a wall module address 0 and CWM may have a wall module address 8).

Several patent applications may relate to the present invention. U.S. patent application Ser. No. 11/957,253, filed Dec. 14, 2007, is hereby incorporated by reference. U.S. patent application Ser. No. 11/923,471, filed Oct. 24, 2007, is hereby incorporated by reference. U.S. patent application Ser. No. 11/777,873, filed Jul. 13, 2007, is hereby incorporated by reference. U.S. patent application Ser. No. 11/770,668, filed Jun. 28, 2007, is hereby incorporated by reference. U.S. patent application Ser. No. 11/747,657, filed May 11, 2007, is hereby incorporated by reference. U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 11/427,750, filed Jun. 29, 2006, is hereby incorporated by reference. U.S. Pat. No. 6,549,826, issued Apr. 15, 2003, U.S. Pat. No. 6,536,678, issued Mar. 25, 2003, U.S. Pat. No. 5,479,812, issued Jan. 2, 1996, are hereby incorporated by reference.

FIG. 1 is a block diagram of structure and process of the flexible graphical engine 10. Wall module bus tool 11 may be used to create KF1.KFS file which contains a custom configuration of I/O and variables present in the CWM configurable function block. The KF1.KFS file may be imported to a graphical/text-based compiler framework 13 (referred to herein as GCF) which could be regarded as a FBEP configuration tool. GCF may be a graphical compiler that includes a framework of algorithms linking a function block engine and a configuration tool into the wall module system via a download tool and a bus. A project can be saved as a proj.fsh file in module 12 for later use. Module 12 may have two-way communication with GCF 13. GCF 13 may provide project configuration, project parameter and project proxy files (proj.cfg, proj.prm and proj.prx) 14 to a Nodemon™ download microprocessor 15. Microprocessor 15 may provide a Nodemon download to a FBEP block 16 (host) via a Lon™ bus. This download may be monitored by a LonWorks™ bus monitor 17. The host 16 may have a function block engine, configuration files, parameter files, proxy files, MSP430™ microprocessor and Neuron™ microprocessor. The MSP430 microprocessor may be connected to the Neuron microprocessor. A download from the Lon bus to block 16 may go to the Neuron microprocessor. A debugger/flasher spid.hex file may be provided from microprocessor 18 via FET 19 with MSP430 to FBEP block 16. FET 19 may be a microprocessor- or PC-JTAG interface or converter box. FET may mean a flash emulation tool. Node utilities tool block 20 may provide a Shortstack™ 2.1.nxe file 21 to FBEP block 16 on a Lon bus. A debugger/flash V1.6.0.hex file 22 may be provided to a CWM 23. FBEP block 16 may download four configuration files to the CWM 23 via a serial wall module bus. This bus may be monitored by a CWM bus monitor 24. Block 16 may be regarded as the host and wall module 23 may be regarded as the client. The CWM may have one or more fixed algorithms or flexible (configured or programmable) algorithms.

System or parallel flexible graphical extension engine 10 may have major portions, which include CWM configuration tool 46, CWM download tool 47 and host/client 48. Tool 46 may include wall module bus tool 11, CWM project tool 12, GCF 13 and project proxy files 14. Tool 47 may include a Nodemon download 15 and Lonworks bus monitor 17. The host/client 48 may include the FBEP engine 16 and the CWM 23.

Figure 2:
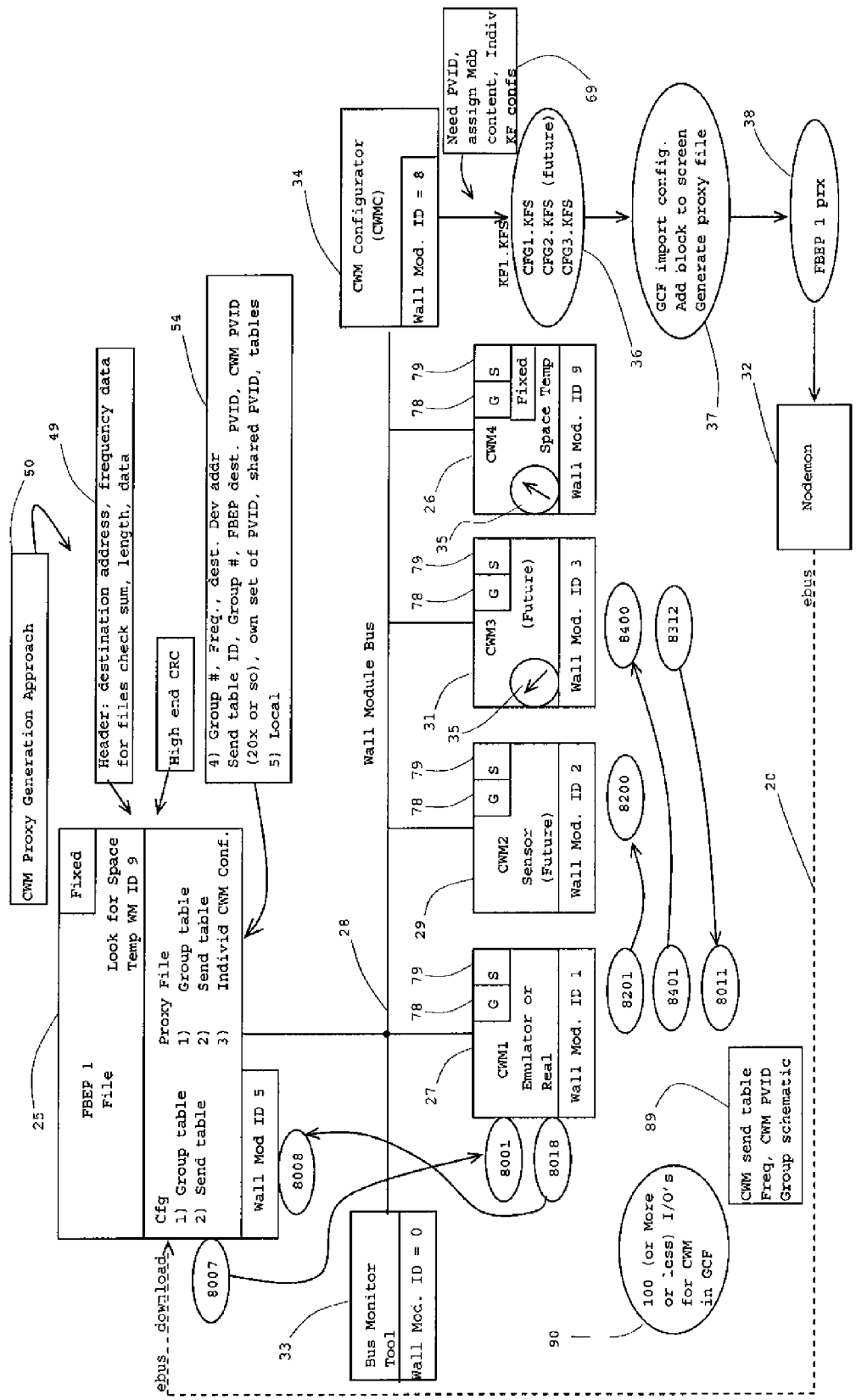
FIG. 2 is a diagram of a wall module proxy generation approach.

FIG. 2 is a diagram of a CWM proxy generation approach 50. One may start at a FBEP 1 file block 25. Block 25 may have a fixed I/O. One may look for a space temp I/O at wall module (WM) ID 9. The space temp I/O may be fixed. A header may list a destination address, frequency data for files, CRC, length, and data, as indicated in box 49. The header may instead be different than this one. Block 25 may represent a high end CRC (cyclical redundancy check). FBEP block 25 may receive an ebus (Echelon™ bus) 20 download from a Nodemon module 32. The FBEP 1 file of block 25 may contain configuration information as Cfg, 1) Group table and 2) Send table. Also, a proxy file in block 25 may contain 1) group table, 2) send table, 3) individual CWM configuration, 4) group #, freq, dest, dev address, send table ID, FBEP destination PVID, CWM PVID (e.g., 20×), its own set of PVID's, shared PVID's, and tables, and 5) local information, as indicated in box 54. The FBEP block 25 may include a WM ID 5. These items are merely illustrative examples, as they could be of other ID's or the like.

FBEP block 25 may be connected via a wall bus module 28 to a CWM 1 block 27 which may be an emulator or a real device (dev). It may be referred to as Wall Mod. (WM) ID 1. Block 25 may have its own set of PVID's. For instance, a PVID 8007 at block 25 may be a PVID 8001 at block 27, and a PVID 8018 at block 27 may be a PVID 8008 at block 25. There may a whole set of PVID's of blocks 25 and 27 that each has with PVID's that correspond to each other even though the corresponding PVID's have different numbers. Items 25 and 27 are the core and the minimum required in the present system. Remaining items are optional. CWM may share with other sources and destinations not involving FBEP.

Figure 6:
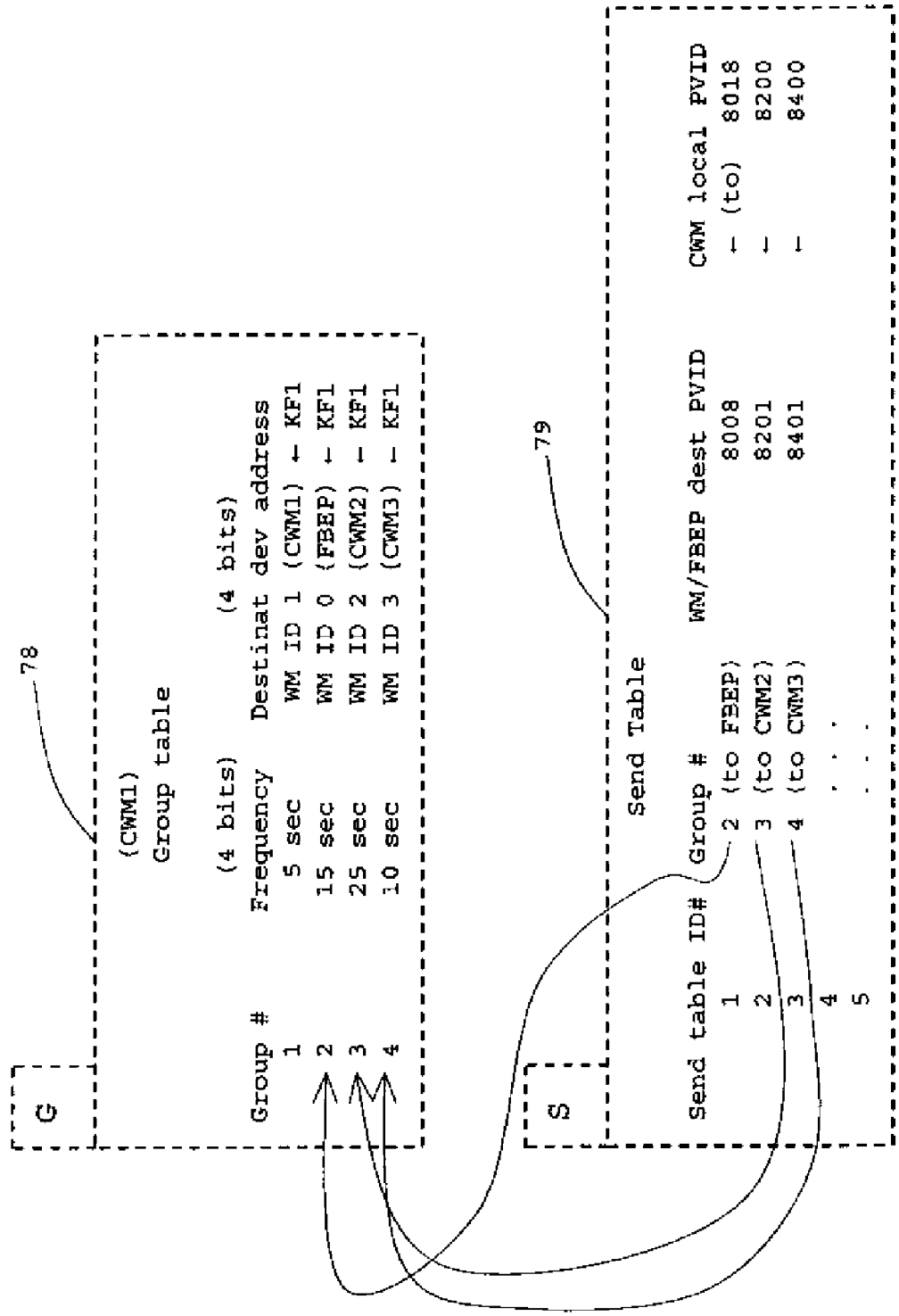
FIG. 6 shows several tables applicable to the wall module flexible function block inputs and outputs.

FBEP block 25 may also be connected a CWM2 sensor (future) 29 wall mod ID 2 and a CWM3 sensor (future) 31 wall mod ID 3. Block 25 may be connected to additional CWM items, such as CWM4 space temp block 26 and wall mod ID 9. Each of the blocks or modules 26, 27, 29 and 31 may have a group table (G) 78 and a send table (S) 79. Examples of these tables 78 and 79 are shown in FIG. 6. Block 31 and 26 may have dials 35 which may set an address by being turned and can change a respective resistance to effect an address setting. Block 26 may be such that its I/O is fixed. As between blocks 25 and 27, the PVID numbers may be different between block 27 and the CWM2 sensor 29 and sensor 31. For instance, PVID 8201 of block 27 may be 8200 for sensor 29, PVID 8401 may be 8400 for sensor 31, and PVID 8312 of sensor 31 may be 8011 for block 27. The corresponding PVID numbers may be for many PVID's between the various blocks or items in the CWM proxy generation approach 50.

Wall module bus 28 may be connected to a bus monitor tool 33. A CWM configurator (CWMC) 34 may be connected to wall module bus 28. Configurator 34 may be identified as with a wall module ID 8 block. One may here need a PVID, assign Mdb content and have individual CWM configurations as indicated in box 69. An output of wall module block 34 may convey a file KF1.KFS to a CFG file block 36. Block 36 may contain CFG1.KFS, CFG2.KFS and CFG3.KFS. These files from block 36 may be moved on to item 37 where GCF imports config., adds blocks to a screen, and generates a proxy file. From item 37, files such as a FBEP 1 prx 38 may go to Nodemon module 32. Module 32 may provide a download via ebus 20 to block 25. A CWM send table, freq., CWM PVID's and group schematic or table, as indicated in box 89, may be sent to FBEP 1 file. It may be noted that there can be 100 (or more or less) I/O's for a CWM wall module in GCF, as indicated in circle 90.

Figure 3A:
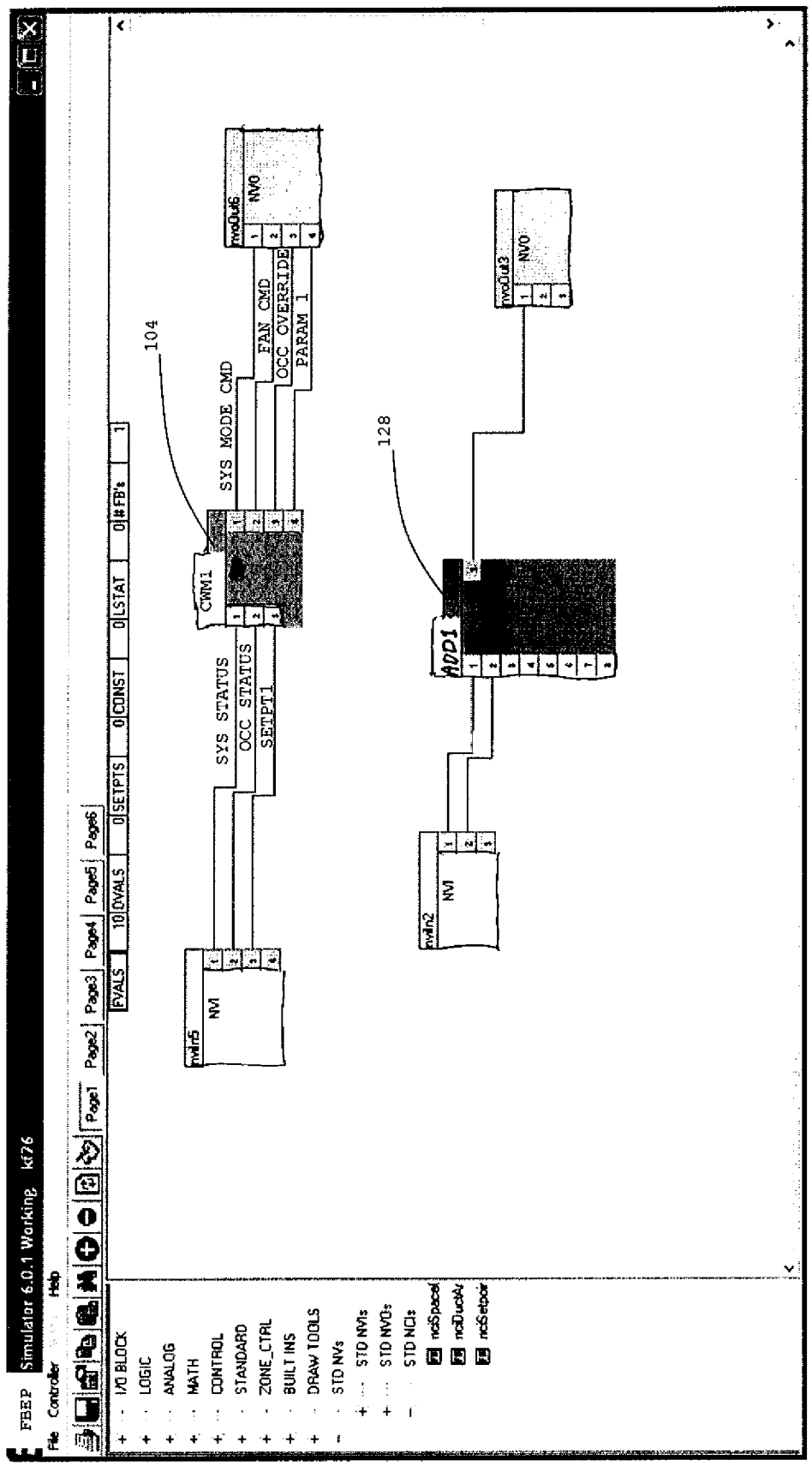
FIG. 3a is a diagram of a function block engine with the wall module.

FIG. 3a is a diagram of a function block engine with the CWM1 104 showing the various inputs (sysStatus, occStatus, setpt1) and outputs (sysModeCmd, fanCmd, occoverride, PARAM 1). Item 128 is an example add function block. FIG. 3b is diagram of a form 127 for indicating the inputs and outputs, with values and other information, of the CWM1 104. FIG. 3c is a table showing function block data and user NV configuration data of the function block scenario of FIG. 3a. FIG. 3d is a table showing function block data and group and send table information.

Each of the function block engines noted herein may have fixed and/or flexible I/O's.

Figure 3E:
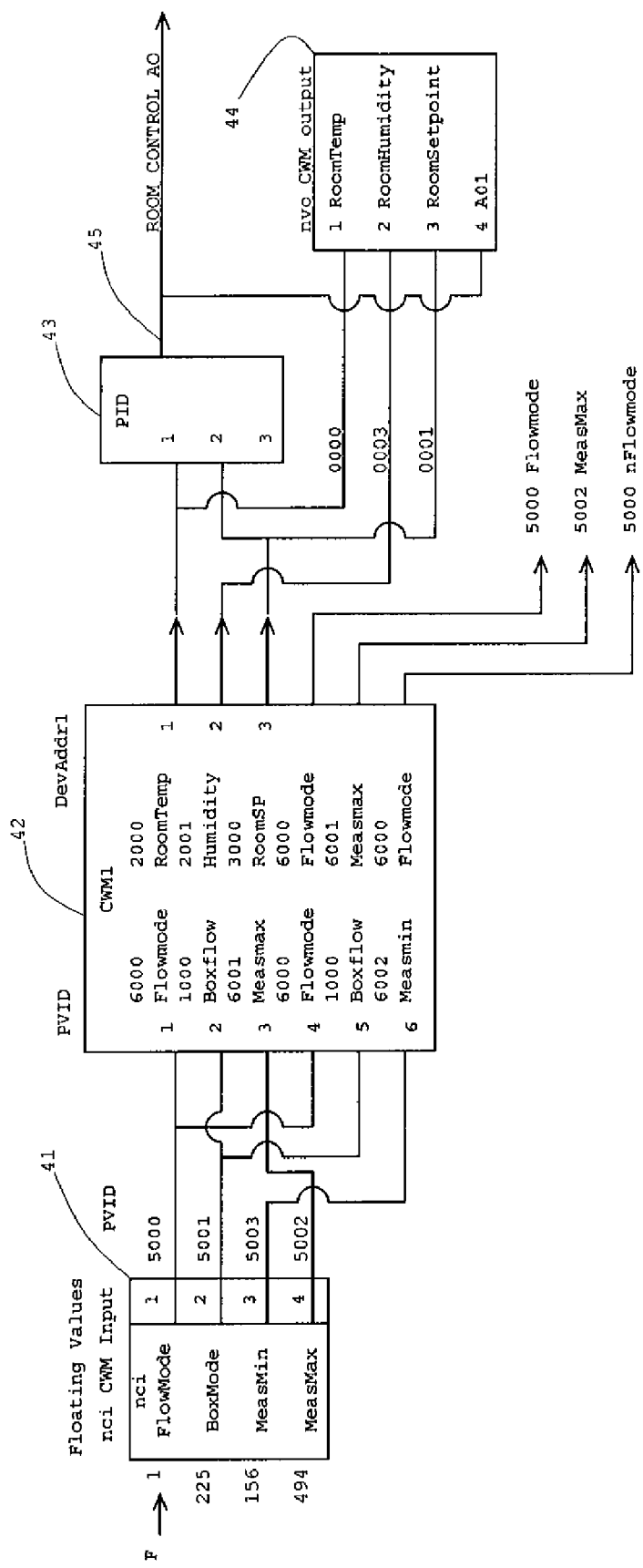
FIG. 3e is a diagram of public variable identification arrangements from the function block to the wall module.

FIG. 3e is a diagram of public variable identification (PVID) arrangements from the function block to the CWM module. For instance, there may be floating values in an nci CWM input. Examples of F values may include 1, 225, 156 and 494 for an nci FlowMode, BoxMode, MeasMin and MeasMax in block 41, which in turn can have terminals 1, 2, 3 and 4. Corresponding PVID's may be 5000, 5001, 5003 and 5002 which can connect to a CWM1 block 42. Respectively, corresponding PVID's may be at terminals 1, 2, 3, 4, 5 and 6 at CWM1 block 42. Terminal 1 of block 41 may be connected to terminals 1 and 4 of block 42. Terminal 2 of block 41 may be connected to terminals 2 and 5 of block 42. Terminals 3 and 4 of block 41 may individually be connected to terminals 6 and 3, respectively. The PVID's of the terminals 1-6 of block 42 connected to the noted terminals of block 41 may include PVID's of 6000 Flowmode, 1000 Boxflow, 6001 MeasMax, 6000 Flowmode, 1000 Boxflow and 6002 MeasMin. The outputs of the CWM1 block 42 may include 2000 RoomTemp, 2001 Humidity and 3000 RoomSP at terminals 1, 2 and 3, respectively. Other outputs of block 42 may include 6000 Flowmode, 6001 MeasMax and 6000 Flowmode which go out as 5000 Flowmode, 5002 MeasMax and 5000 nFlowmode, respectively. The output from terminal 1 at block 42 may go as 0000 to a terminal 1 at a PID block 43 and to a terminal 1 RoomTemp at an nvo CWM output block 44. The output from terminal 2 at block 42 may go as 0003 to a terminal 2 RoomHumidity at block 44. The output from terminal 3 at block 42 may go as 0001 to a terminal 3 RoomSetpoint at block 44 and to terminal 2 at PIVD block 43. An output on a line 45 from PID block 43 may be a Room Control AO signal. Line 45 may be connected to a terminal 4 which is an AO1 of the nvo CWM output block 44.

FIG. 4 is a diagram of the interconnections among components having fixed and flexible function block I/Os. An ebus 51 may provide an Echelon LonWorks connection to a FBEP 1 function block engine 52 having a Neuron processor. The I/O for the function block engine 52 may be fixed. System 52 may be connected to a CWM 53 having a microprocessor, via a two wire polarity insensitive power line and communication bus. CWM 53 may have a flexible function block I/O. The various components, which are a part of or connected to the CWM 53, may include heat/cool/auto/off controls 55, an/off auto fan switch 56, a space temperature sensor 57, a CO2 sensor 58, a setpoint control 59, an effective setpoint control 61, a system display mode selector 62, a bypass switch 63, and other items. The preceding sentence provides examples of selectable I/O's. FBEP engine 52 and CWM 53, components, connections, and the fixed and flexible function block I/O's 67 may make up an interface system 65. Ebus 51 may also be connected to a FBEP 2 function block engine 68 having a Neuron processor and connected to a CWM. Ebus 51 may be connected to another interface system 66 having a similar structure and components like those of system 65. Ebus 51 may be connected to additional interface systems.

FIG. 5 is a diagram of a rudimentary layout of a function block mechanism 71 and its interface with a CWM 72. The interface communication may be via a bus 73 and an I/O 74. I/O 74 may be a flexible function block I/O. For instance, a PVID 8001, an input to mechanism 71, may be translated to a PVID 1001 via I/O 74 for transmission to CWM 72. In function block mechanism 71, PVID 8001 may go to an input of an add function block 75. An output of block 75 may have a PVID 8003. The PVID 8003 may go to a PID block 76 which in turn may provide an output from function block mechanism 71. The PVID 8003 may go to CWM 72 where it is connected as a PVID 1002. I/O 74 is flexible such that the PVID's may be changed to those as desired for the CWM 72.

FIG. 6 shows several tables applicable to the CWM flexible function block I/O. A CWM group (G) table 78 may for each group indicate frequency and destination device address. For groups #1, 2, 3 and 4, the frequency is 5 sec., 15 sec., 25 sec. and 10 sec., respectively, and the destination dev Address is WM ID 1 (CWM1), WM ID 0 (FBEP), WM ID 2 (CWM2) and WM ID 3 (CWM3), respectively (KF1's). A send table (S) 79 may, for each send table ID#, have a group #, a WM/FBEP dest PVID and a CWM local PVID. For send table IDs 1, 2 and 3, the group # is 2 to FBEP, 3 to CWM 2 and 4 to CWM 3, respectively. The WM/FBEP dest PVID is 8008, 8201 and 8403, respectively, and the CWM local PVID is 8018, 8200 and 8400 corresponding to the respective WM/FBEP dest PVID. There may be similar entries for the send table ID #'s of 4, 5 and so on.

Figure 7:
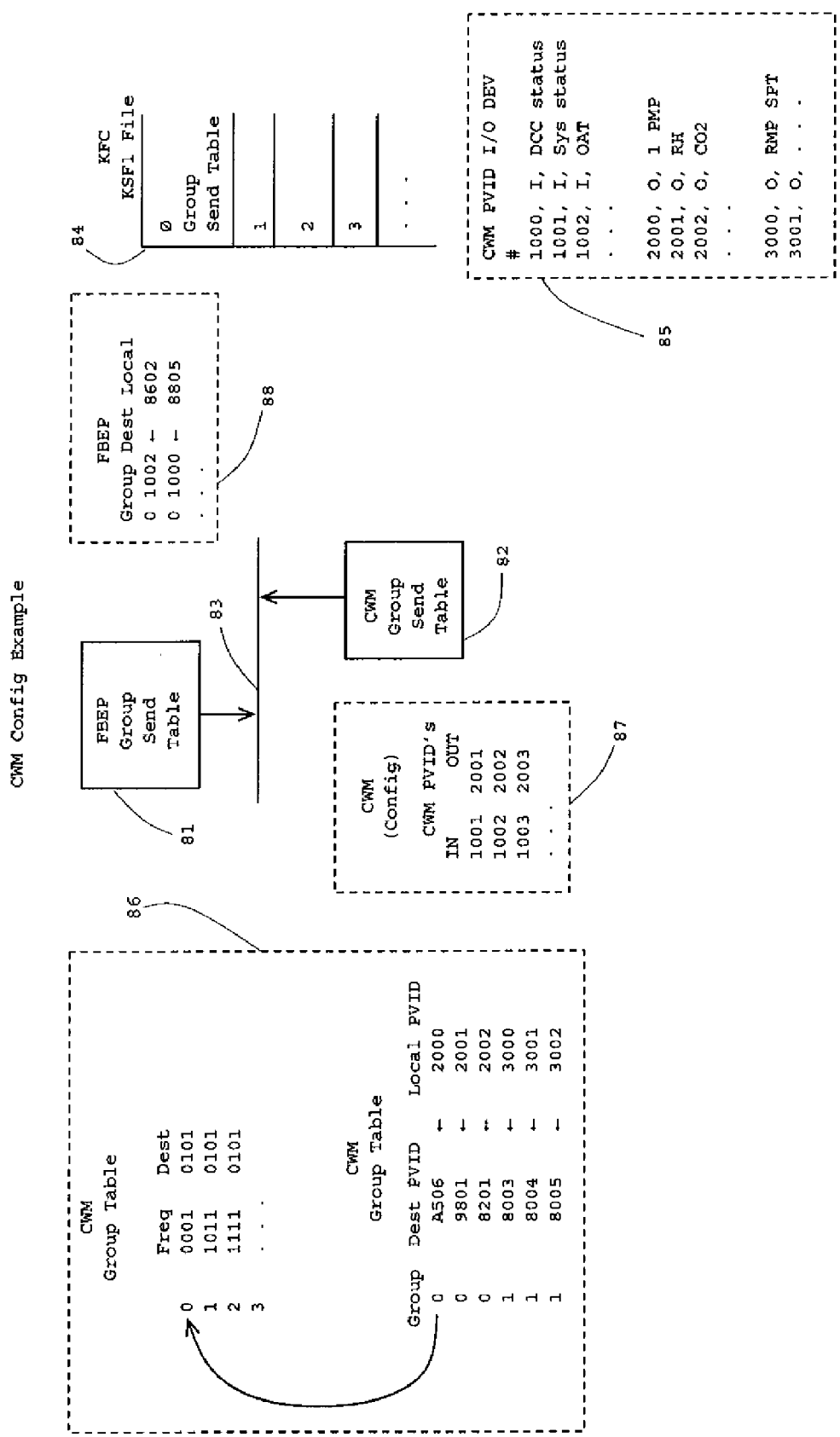
FIG. 7 has several tables relating to a wall module configuration example.

FIG. 7 has several tables relating to a CWM configuration example. A CWM group table in box 86 shows respective Freq and destination numbers for each group. A second CWM group table in box 86 may be associated with the first CWM group table. The first group table may for each group show the frequency as destination in binary code for groups 0, 1, 2 and so on, which may have frequency 0001, 1001, 1111, and so forth, corresponding to destination numbers 0101, 0101, 0101, respectively, and so on. The second CWM group table may list groups having a dest PVID and a local PVID corresponding to the respective dest PVID. For instance, for each group 0, there may be dest PVID's A506, 9801, and 8201, and local PVID's 2000, 2001 and 2002 corresponding the dest PVID's, respectively. In another instance, for each group 1, there may be dest PVID's 8003, 8004 and 8005, and local PVID's 3000, 3001 and 3002 corresponding to the dest PVID's, respectively. The group 0 of the second CWM group table may correspond to the group 0 of the first CWM group table, group 1 to group 1 for like respective tables, and so on.

FIG. 7 also shows a diagram showing a FBEP group send table 81 and a CWM group send table 82 connected to a bus 83. An example of a FBEP group send table 81 may include a group 0 having a dest number 1002 and a local number 8602 corresponding to the number 1002, and again for group 0 have a dest number 1000 and a local number 8805 corresponding to the number 1000, as shown in a table 88. FBEP table 81 may continue in a similar pattern for group 0 and other groups. An example of a CWM group send table 82 may include items of a table 87 having CWM (Config) CWM PVID's for IN and OUT. IN PVID's may be 1001, 1002, 1003, . . . , with corresponding OUT PVID's 2001, 2002, 2003 . . . .

FIG. 7 also has a diagram of a CWMC KSF1 file 84 showing a 0 Group Send Table, 1, 2, 3 and so on. Below the KFC KSF1 file diagram is a representative table 85 of a CWM PVID number, an I/O designation and device. The entries corresponding to these headings may include 1000, I, DCC status; 1001, I, Sys status; 1002, I, OAT; and so forth for the 1000 series of CWM PVID #'s. The entries for the 2000 series of CWM PVID #'s may include 2000, O, 1 PMP; 2001, O, RH; 2002, O, CO2; and so forth. The 3000 series may include 3000, O, RMP SPT; 3001, O, . . . ; and so on. The table may continue with higher or other series PVID #'s.

Figure 8:
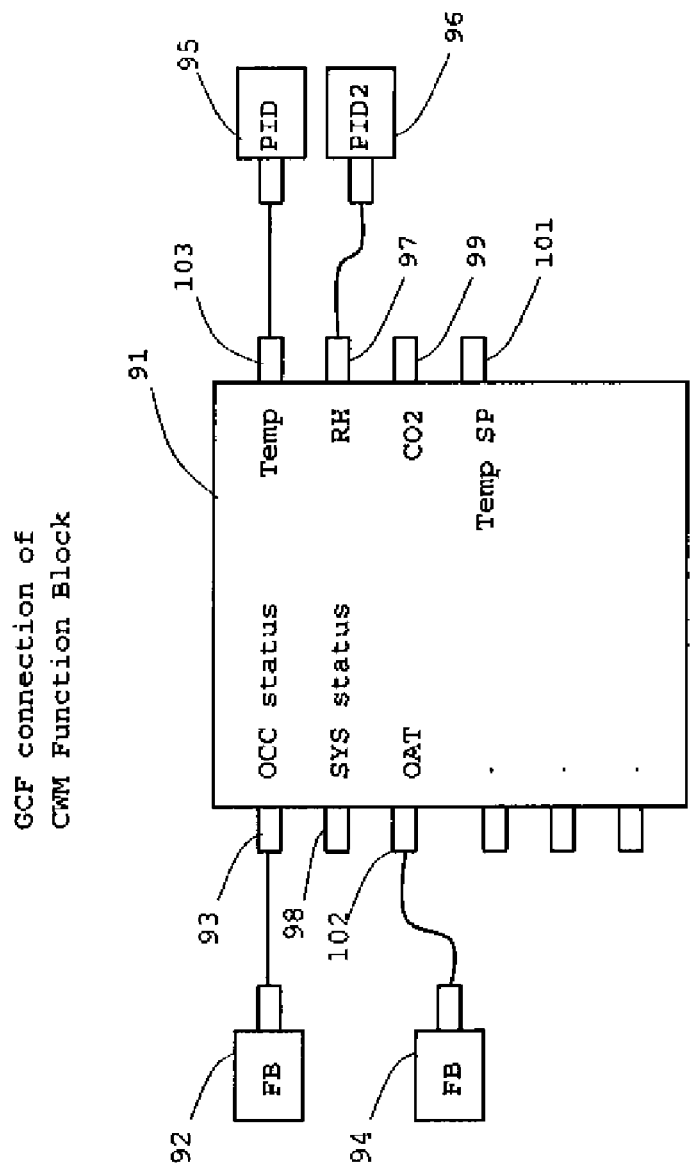
FIG. 8 shows a hardware diagram and a table relative to a wall module bus tool.

FIG. 8 is another example of the CWM block 91 as configured by GCF. Examples of connections to CWM function block 91 may be noted. In this example, an external function block may create an input to set the value of occstatus. The fixed or programmable logic in the CWM block 91 may use this value to affect the output value such as Temp SP. Output valve temp may be shown connected to another PID block. In this example, the connections show the function blocks sharing information to a remote CWM. A function block 92 may be connected to an OCC status terminal 93. A function block 94 may be connected to an OAT terminal 102. A PID 95 may be connected to a Temp terminal 103. A PID2 96 may be connected to an RH terminal 97. Other terminals on module 91 may include SYS status terminal 98, CO2 terminal 99 and Temp SP terminal 101. Module 91 may have additional terminals as needed.

Figure 9:
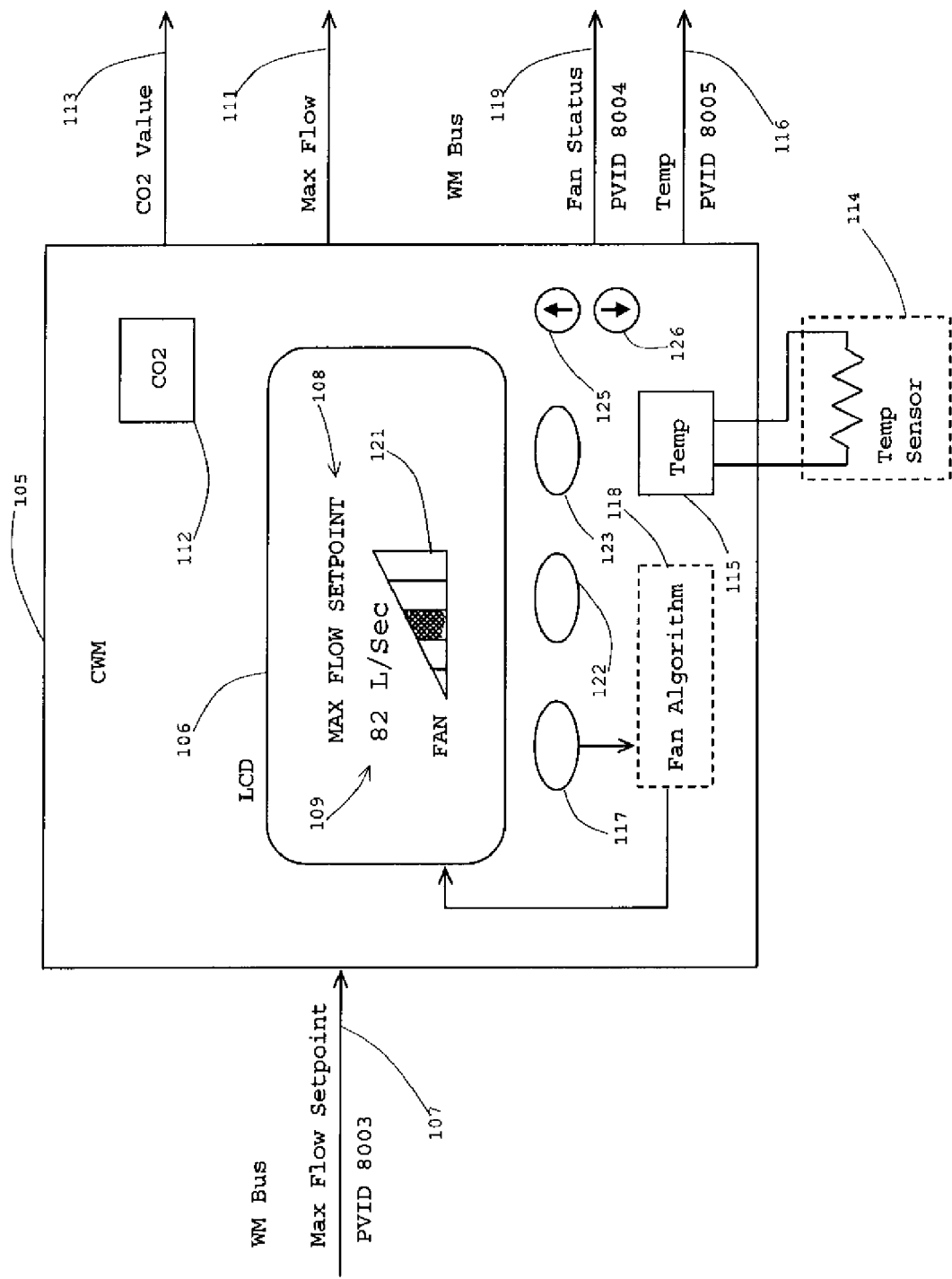
FIG. 9 is a diagram of an example wall module.

FIG. 9 is a diagram of an example CWM 105 showing a sampling of sensors, controls and an LCD display 106. The PVID's listed in FIG. 9 are for the CWM PVID's only. These PVID's are typically mapped to the function block PVID in the host FBEP or other modules. For instance, a line 107 from the wall module bus may provide a max flow setpoint PVID 8003 to module 105. "Max Flow Setpoint" may appear in a label 108 on display 106. Under label 108 may appear a label 109 showing a setpoint of "82 L/Sec". A max flow signal may be output on line 111. There may be a CO2 sensor 112 which can output a CO2 value on a line 113. There may be a temperature sensor 114 either in or proximate to module 105, or remote from module 105. A temperature indication may go to temperature electronics 115 to be processed for display and/or sending out a signal indicative of the temperature datum or data. The signal may have a PVID 8005 and be provided on a line 116.

There may be a fan button 117 for turning on or off a fan, and if on, buttons 125 and 126 for adjusting the fan speed. Buttons 117, 125 and 126 may be connected to a fan algorithm 118. Algorithm 118 may provide a fan status or control signal on a line 119. The fan signal may have a PVID 8004. Also, algorithm 118 may be connected to display 106 to provide an indication of fan status, such as speed, as a symbol 121 on display 106. Other buttons 122 and 123 may be present for providing or controlling the present and other parameters at module 105. Lines 111, 113, 116 and 119 may be part of the wall module bus. CWM 105 may have flexible (customized) I/O's and fixed or configured selectable I/O's.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A graphical extension engine comprising:
a configuration tool;
a download tool connected to the configuration tool;
a host connected to the download tool; and
a client connected to the host; and
wherein:
the host is a function block engine platform comprising a first function block engine; and
the client is a configurable wall module comprising at least one second function block engine; and
wherein each of the first and second function block engine includes:
one or more function block execution modules;
a block execution list including references to at least one of the one or more function block execution modules, and public variable references to a function block variable space;
an input configuration to configure inputs for use by each function block engine in the function block variable space;
an input convert module to execute the input configuration;
an output configuration to configure outputs of the function block engine in the function block variable space;
an output convert module to execute the output configuration;
the first function block engine has a first public variable identification (PVID) system;
the second function block engine has a second PVID system;
PVID's of signals from the first function block engine to the second function block engine, are converted to PVID's of the second function block engine; and
PVID's of signals from the second function block engine to the first function block engine, are converted to PVID's of the first function block engine.

2. The engine of claim 1, wherein the configuration tool comprises:
a bus tool;
a project file mechanism connected to the bus tool; and
a graphical compiler connected to the project file mechanism and the bus tool.

3. The engine of claim 2, wherein the download tool is for conveying a configuration from the configuration tool to the host for the client.

4. The engine of claim 3, wherein the configuration can be conveyed by the download tool on-the-fly.

5. The engine of claim 1, wherein:
the host can convey the configuration to the client; and
the function block engine of the host can affect the configuration on-the-fly.

6. The engine of claim 1, wherein:
the host is connected to the download tool via a first bus; and
the client is connected to the host via a second bus distinct from the first bus.

7. A parallel flexible graphical extension engine comprising:
a first function block engine;
a configurator for providing files to the first function block engine; and
at least one wall module that includes a second function block engine connected to the first function block engine; and
wherein each of the first and second function block engines includes:
one or more function block execution modules;
a block execution list including references to at least one of the one or more function block execution modules, and public variable identifications (PVID's) relative to a function block variable space;
an input configuration to configure inputs for use by the function block engine in the function block variable space;
an input convert module to execute the input configuration;
an output configuration to configure outputs of the function block engine in the function block variable space;
an output convert module to execute the output configuration;
the first function block engine has a first public variable identification (PVID) system;
the second function block engine has a second PVID system;
PVID's of signals from the first function block engine to the second function block engine, are converted to PVID's of the second function block engine; and
PVID's of signals from the second function block engine to the first function block engine, are converted to PVID's of the first function block engine.

8. The engine of claim 7, wherein the first function block engine is for sending group tables and send tables to the wall module.

9. The engine of claim 8 wherein the wall module has fixed function block I/O's and flexible function block I/O's.

10. The engine of claim 9, wherein the flexible function block I/O's may be changed on the fly.

11. The engine of claim 9, wherein the fixed function block I/O's are selectable.

12. The engine of claim 8, wherein the tables are sent via a two-wire polarity insensitive or wireless bus.

13. The engine of claim 8, wherein the send table comprises at least one of:
a group number,
function block destination PVID's;
wall module PVID's; and
own PVID's.

14. The engine of claim 8, wherein the at least one wall module has a PVID different from the PVID of the first function block engine for a given parameter.

15. The engine of claim 8, further comprising an approach for tracking connections between node PVID's including PVID source addresses, PVID destination addresses, node source and destination addresses and optional update rates.

16. The engine of claim 7, wherein one or more function block execution modules of the first function block engine are connected to the at least one wall module.

17. The engine of claim 7, wherein the wall module comprises:
a display;
inputs connected to the wall module bus; and
outputs connected to the wall module bus; and
wherein signals on the inputs and outputs have PVID's.

18. A method for configuring a wall module comprising:
providing a configuration for a configurable wall module;
downloading the configuration to a host comprising a first function block engine; and
downloading the configuration from the host to the wall module, the wall module comprising a second function block engine; and
wherein each of the first and second function block engine includes:
one or more function block execution modules;
a block execution list including references to at least one of the one or more function block execution modules, and public variable references to a function block variable space;
an input configuration to configure inputs for use by the function block engine in the function block variable space;
an input convert module to execute the input configuration;
an output configuration to configure outputs of the function block engine in the function block variable space;
an output convert module to execute the output configuration;
the first function block engine has a first public variable identification (PVID) system;
the second function block engine has a second PVID system;
PVID's of signals from the first function block engine to the second function block engine, are converted to PVID's of the second function block engine; and
PVID's of signals from the second function block engine to the first function block engine, are converted to PVID's of the first function block engine.

19. The method of claim 18, wherein:
the first function block engine has fixed and/or flexible I/O's; and
the second function block engine has flexible I/O's, fixed I/O's, or both flexible and fixed I/O's.

20. The method of claim 19, further comprising:
defining customized I/O's for the wall module;
selecting fixed I/O's as desired for the wall module; and
defining virtually any number of I/O's for the wall module.

21. The method of claim 18, wherein the wall module can have fixed algorithms, configured or programmable flexible function block engine algorithms, or both fixed and configured or programmable flexible function block engine algorithms.

* * * * *